(12) United States Patent
LinneVonBerg et al.

(10) Patent No.: US 7,659,906 B2
(45) Date of Patent: Feb. 9, 2010

(54) AIRBORNE REAL TIME IMAGE EXPLOITATION SYSTEM (ARIES)

(75) Inventors: Dale C. LinneVonBerg, Columbia, MD (US); Melvin Kruer, Fort Washington, MD (US); Michael Colbert, Vienna, VA (US); Russell Smith, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1216 days.

(21) Appl. No.: 10/911,754

(22) Filed: Jul. 29, 2004

(65) Prior Publication Data

US 2006/0022986 A1 Feb. 2, 2006

(51) Int. Cl.
*G06F 13/00* (2006.01)
*G06K 9/00* (2006.01)
*H04N 7/18* (2006.01)

(52) U.S. Cl. .................. 345/536; 382/103; 348/144
(58) Field of Classification Search ................ 345/558, 345/530, 537, 536, 531; 382/100, 103, 107; 340/933, 937; 348/143, 144, 148
See application file for complete search history.

(56) References Cited

U.S. PATENT DOCUMENTS 5,557,733 A * 9/1996 Hicok et al. ................ 345/554
5,809,161 A * 9/1998 Auty et al. .................. 382/104
6,816,753 B2 * 11/2004 Sakamoto et al. ........... 700/245
2005/0226463 A1 * 10/2005 Suzuki et al. ............... 382/103

OTHER PUBLICATIONS

Riedel, Richard D. "Real-Time Exploitation System." Jul. 1998. Proceedings of SPIE Conference on Airborne Reconnaissance XXII, vol. 3431, pp. 81-87.*

* cited by examiner

*Primary Examiner*—Joni Hsu
(74) *Attorney, Agent, or Firm*—John J Karasek; Suresh Koshy

(57) ABSTRACT

An apparatus includes an image buffer, a graphics buffer, a memory, a router, and a sensor interface. The apparatus further includes a memory controller for controlling transfer of image data from the image buffer to the memory via the router and for controlling transfer of graphics data from the memory to the graphics buffer via the router. The apparatus also includes an image controller simultaneously operable with the memory controller for controlling transfer of the image data from the sensor interface to the image buffer. Optionally, the sensor interface comprises a receiver and a transmitter. Optionally, the apparatus further includes a header buffer, and a header controller simultaneously operable with the memory controller for controlling transfer of header data from the sensor interface to the header buffer. The apparatus optionally further includes a sensor for communicating with the header controller via the sensor interface.

23 Claims, 3 Drawing Sheets

AIRBORNE REAL TIME IMAGE EXPLOITATION SYSTEM (ARIES)

TECHNICAL FIELD

The present invention relates generally to a system for image exploitation, and more particularly to a system for real-time digital image capture and exploitation using improved memory management.

BACKGROUND ART

Prior to 1996, U.S. Navy airborne tactical reconnaissance systems used film-based camera systems. Use of film camera technology required the reconnaissance aircraft to return to the carrier after taking the desired picture. Upon landing, the film canister was unloaded and carried to the carrier's photo laboratory for processing. Once processing was complete, the film negative roll was visually scanned on a light table to find the desired picture of the target area. Once the target area was detected, the negative was cropped and a contact hardcopy print was developed. This hard copy was used for final target review or placed on a scanner to generate a digital copy of the hardcopy photo for subsequent distribution. In many cases, this process could take several hours after an aircraft landed to obtain a picture of a desired target area. With the introduction of digital cameras into Navy reconnaissance systems starting in the mid-1990's, film-based processing was no longer required. An example of such early digital camera systems includes the Tactical Air Reconnaissance Pod System—Digital Imagery (commonly known in the industry as TARPS-DI), wherein digital recorders were used to store the imagery taken by these digital cameras instead of film-based canisters. The data bricks, or tapes, from these digital recorders could be loaded directly into the imagery exploitation stations on the carrier without the additional processing required by the film-based systems. Although the imagery was already in digital form, the digital imagery still needed to be screened on the exploitation station to find the desired target area. With the introduction of real-time wide-band RF digital data links into reconnaissance systems with digital cameras, the Navy obtained the capability to transmit real-time digital imagery to the carrier from the aircraft as the images were taken. Examples of such reconnaissance systems include the 1999 Tactical Air Reconnaissance Pod System—Completely Digital (commonly known in the industry as TARPS-CD), the 2001 Tactical Air Reconnaissance Pod System—Full Capability (commonly known in the industry as TARPS-FCAP), and the 2002 Shared Reconaissance Pod (commonly known in the industry as SHARP). Transit back to and landing on the carrier was no longer required to obtain an image in the intelligence center ("intel center") assuming the aircraft was within link range. When compared to the film-based reconnaissance systems, the use of digital cameras with real-time digital data links significantly reduced the time required to take a picture and have it analyzed in the carrier's intel center. Reduction of the time required to get a picture to the intel center is critical to be able to attack time-critical targets, such as mobile targets. This time is referred to as the "sensor-to-shooter" time. Although the application of digital cameras and digital links into reconnaissance systems significantly reduced the sensor-to-shooter time for many missions compared to film-based systems, the link range of the digital links was still a limiting factor. Most wide-band digital links used on tactical aircraft are line of sight links and hence limited by the curvature of the earth to approximately 200 nautical miles. In these circumstances, this distance limitation negates the real-time use of the digital link and requires the reconnaissance aircraft to once again land on the carrier to drop off its digital recorder brick, or tape, in order for the imagery to be exploited on the intel systems. Significant time is lost because the imagery cannot be exploited or reviewed in the aircraft prior to landing on the carrier and loading the digital recorder information into the carrier's exploitation systems.

DISCLOSURE OF THE INVENTION

The Airborne Real-time Image Exploitation System ("ARIES"), described below, addresses a heretofore unrecognized need for an airborne reconnaissance system that facilitates data visualization processing tools to aircraft operators so that they can exploit the captured imagery, prior to landing and processing the image data on a carrier's exploitation system station. ARIES optionally includes an advanced image capture, display, and processing system that can be used, by way of example, for airborne in-cockpit exploitation of reconnaissance and surveillance sensors. This system provides direct or indirect sensor input interfaces and allows for secondary dissemination of the exploited imagery chips through the host aircraft's communications and imagery dissemination capabilities. ARIES has commercial and military utility in imagery applications involving time-critical targets. It is recognized that, in spite of the name ARIES, one of ordinary skill in the art will readily appreciate that the invention has non-airborne applications, such as land-based telemetry applications.

According to an embodiment of the invention, an apparatus includes an image buffer, a graphics buffer, a memory, a router, and a sensor interface. The apparatus further includes a memory controller for controlling transfer of image data from the image buffer to the memory via the router and for controlling transfer of graphics data from the memory to the graphics buffer via the router. The apparatus also includes an image controller simultaneously operable with the memory controller for controlling transfer of the image data from the sensor interface to the image buffer. Optionally, the sensor interface comprises a receiver and a transmitter.

Optionally, the apparatus further includes a header buffer, and a header controller simultaneously operable with the memory controller for controlling transfer of header data from the sensor interface to the header buffer. The apparatus optionally further includes a sensor for communicating with the header controller via the sensor interface. The sensor optionally includes an infrared sensor, a multi-spectral sensor, an electro-optical sensor, a synthetic aperture radar sensor, an electronic intelligence sensor, a hyper-spectral sensor, a microwave sensor, and/or a biological agent sensor. Optionally, the header controller transmits a sensor header command to the sensor via the sensor interface. Optionally, the sensor header command comprises an orientation instruction for the sensor.

Optionally, the apparatus further includes a video generator; and a graphics controller for receiving graphical data from the graphics buffer and for transferring at least a portion of the graphical data to the video generator, the video generator generating, based in part on the at least a portion of the graphical data, output conforming to a display type.

Optionally, the apparatus further includes a sensor for communicating with the image controller via the sensor interface. The sensor optionally includes an infrared sensor, a multi-spectral sensor, an electro-optical sensor, a synthetic aperture radar sensor, an electronic intelligence sensor, a hyper-spectral sensor, a microwave sensor, and/or a biological agent sensor. Optionally, the image controller receives a sensor operation status to said sensor via the sensor interface. Optionally, the sensor operation status comprises an image capture parameter for the sensor.

Optionally, the memory comprises a plurality of images, the apparatus further including a control panel for communicating with the memory controller to select an image of the plurality of images, to select a portion of the image for transfer to said graphics buffer, to select an image resolution of the portion, and/or to designate a point of interest in the portion.

In an alternative embodiment of the invention, an apparatus includes a header buffer, a graphics buffer, a memory, a router, and a sensor interface. The apparatus includes a header controller for controlling transfer of header data from the sensor interface to the header buffer. The apparatus also includes a memory controller simultaneously operable with the header controller for controlling transfer of the header data from the header buffer to the memory via the router and for controlling transfer of graphics data from the memory to the graphics buffer via the router. Optionally, the header controller transmits a pointer command to the sensor interface. Optionally the pointer command compensates for a difference between a programmed sensor position and an actual sensor position. Optionally, the apparatus further includes a compressor for communicating with the header buffer, a data recorder and/or a data link, and a router interfacing between the compressor, and the data recorder and/or the data link.

Optionally, the apparatus further includes an image buffer, and an image controller simultaneously operable with the memory controller for controlling transfer of image data from the sensor interface to the image buffer to the image buffer. Optionally, the image controller receives an image capture status from the sensor interface. Optionally, the image capture status comprises exposure control data, temperature data, pod-mounting data, a step-stare instruction, a strip-mode instruction, and/or a spot-mode instruction. Optionally, the apparatus further includes a compressor for communicating with the image buffer, a data recorder and/or a data link, and a router interfacing between the compressor, and the data recorder and/or the data link. Optionally, the apparatus further includes a sensor for communicating with the image controller via the sensor interface. The sensor optionally includes an infrared sensor, a multi-spectral sensor, an electro-optical sensor, a synthetic aperture radar sensor, an electronic intelligence sensor, a hyper-spectral sensor, a microwave sensor, and/or a biological agent sensor.

Optionally, the apparatus further includes a video generator, and a graphics controller for receiving graphics data from the graphics buffer and for transferring pixel data to the video generator, the video generator converting the pixel data into display format data.

Optionally, the memory includes a plurality of images, the apparatus further including a control panel for communicating with the memory controller to select an image of the plurality of images, to select a portion of the image for transfer to said graphics buffer, to select an image resolution of the portion, and/or to designate a point of interest in the portion.

BEST MODES OF CARRYING OUT THE INVENTION

ARIES provides a user with the ability to exploit imagery collected from one or more sensors in real time. Optionally, ARIES facilitates capture of high resolution digital image, any associated annotation data, and/or any associated graphics data from a sensor, stores the image and annotation in memory for later use, decimates the image, if necessary, for use in a real-time display waterfall, and/or allows a user to display a portion of the image at various zoom levels. For example, a captured, high resolution image includes a 5050 pixel×5050 pixel image. Alternatively, higher or lower image resolutions are also suitable depending on the application and/or data transfer capabilities. The size of the portion of the high resolution image is, for example, commensurate with a size of an exploitation display. For example, the portion has a 512 pixel×512 pixel size amenable to a standard cockpit monitor. Optionally, as discussed below, ARIES allows the user to exploit imagery while collecting imagery.

Figure 1:
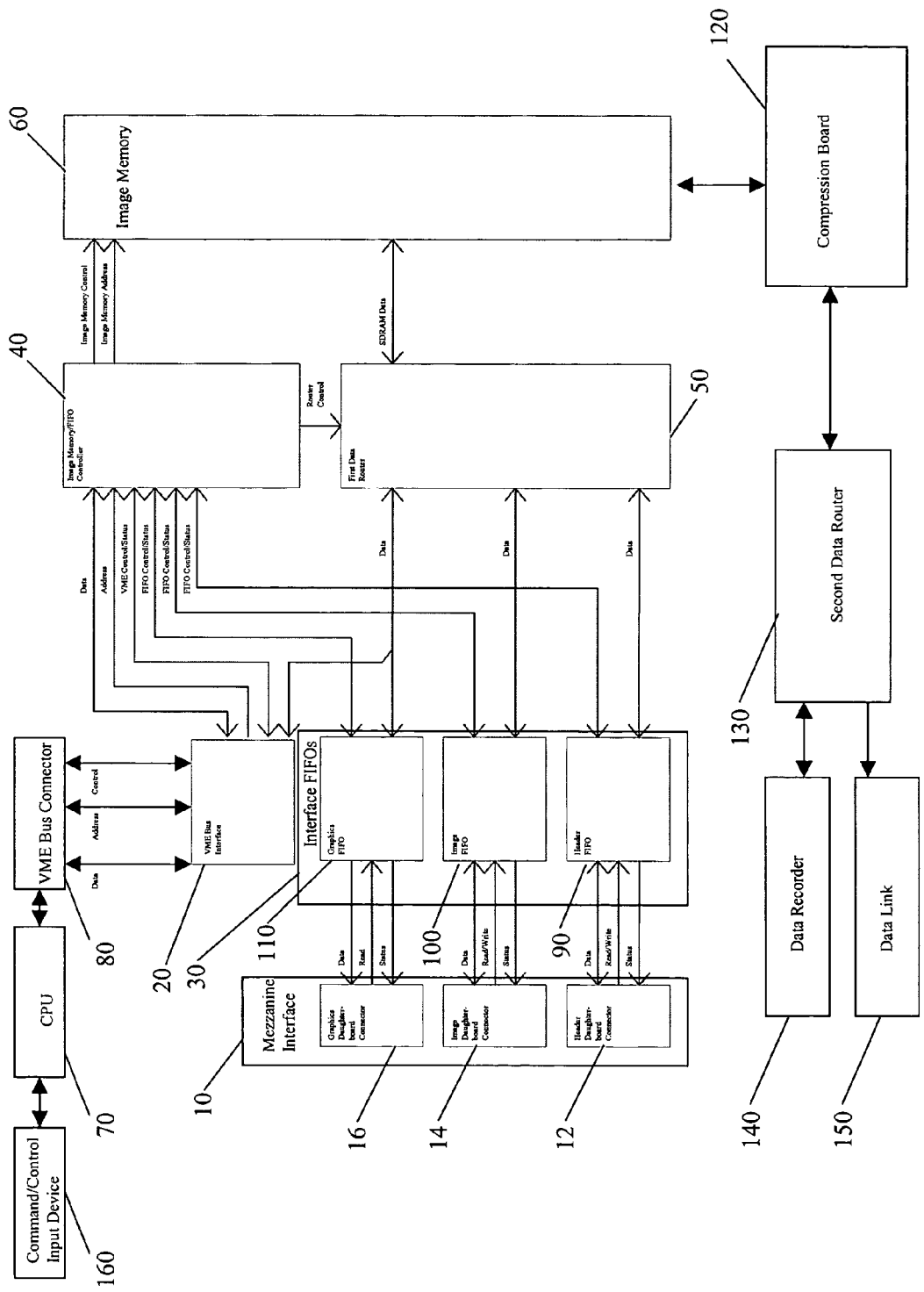
FIG. 1 is a schematic diagram of an embodiment of a main board of the invention.
Figure 2:
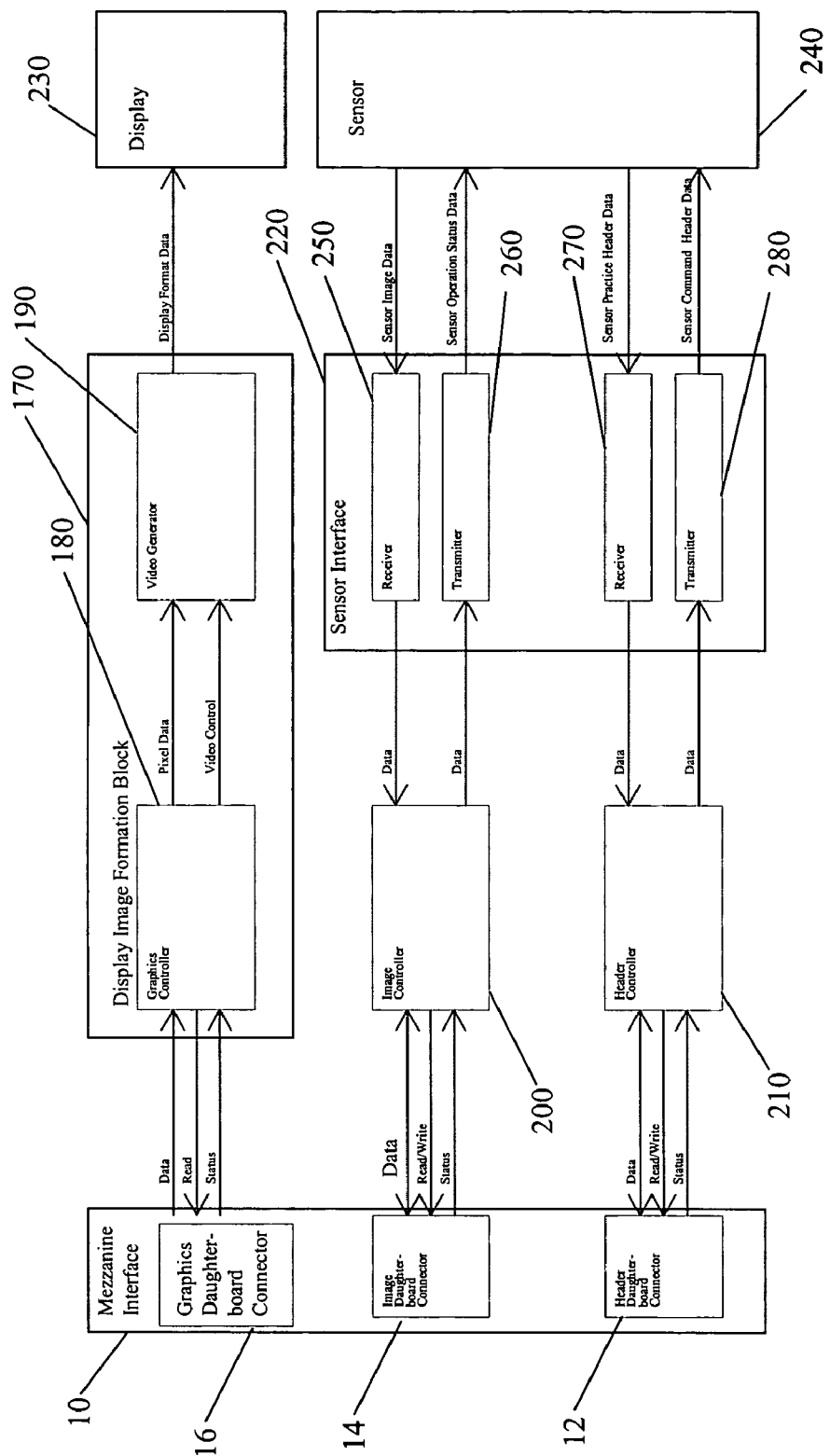
FIG. 2 is a schematic diagram of an embodiment of a sensor interface and graphics mezzanine board of the invention.
Figure 3:
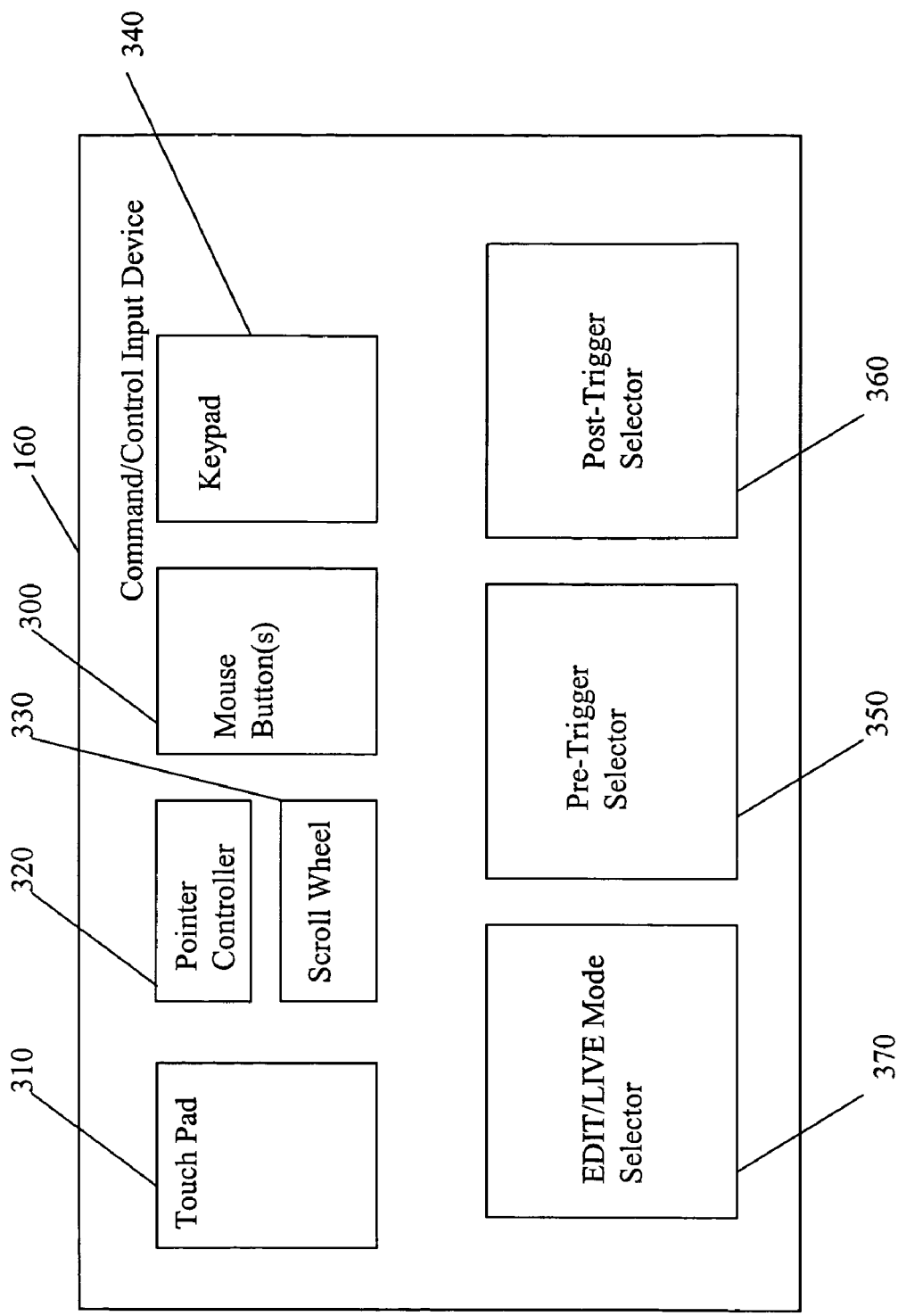
FIG. 3 is a schematic diagram of an embodiment of an input device of the invention.

As shown in FIGS. 1 and 2, ARIES, for example, includes two subsystems: 1) the main board, and 2) the sensor interface and graphics mezzanine. Alternatively, the components of each subsystem are co-located on a common board or communicate with each other across multiple boards.

The main board includes, for example, a mezzanine interface 10, a bus interface 20, interface first-in-first-out ("FIFOs") memory devices 30, an image memory/FIFO controller 40, a first data router 50, and an image memory 60. The bus interface 20 includes, for example, a VME bus interface, a peripheral component interconnect bus interface, a compact peripheral interconnect bus interface, or equivalent bus architecture interface. Using a VME bus interface as an example, the main board is hosted, for example, on a 6 U size VME bus circuit board. The bus interface 20 is hosted, for example, within a field programmable gate array ("FPGA") on the main board. Alternatively, the bus interface 20 is hosted, for example, on an application specific integrated circuit, a complex programmable logic device, a configurable logic device, or other equivalent circuit logic.

The mezzanine interface 10 includes high speed connectors organized into a number of channels for providing a path for high resolution digital image data, annotation data, and/or graphics data. The number and allocation of channels depend, for example, on bandwidth, image size, and/or content constraints. For example, the mezzanine interface 10 includes four channels of which two of the channels provide a path for the high resolution image data, one of the channels provides a path for the annotation data, and one of the channels provides a path for the graphics data. Data are optionally received and transmitted over the image data channels, and the annotation and graphics channels simultaneously.

ARIES stores and manipulates images without requiring transfer of data to the central processing unit ("CPU") 70 or equivalent processors. The CPU communicates with the bus interface 20 via a bus connector 80, for example, to access image annotation data and manage where images are stored within the image memory 60 at a rate commensurate with bus architecture transfer rates, e.g., VME bus transfer rates. Configuration of ARIES is accomplished via the bus interface 20. Optionally, the graphics overlay is written by the CPU 70, for example, to ARIES via the bus interface 20. The graphics overlay includes, for example, computer-generated text and/or symbology written on top of a displayed image. Such computer-generated text includes, for example, a frame number, a latitude/longitude figure, and/or a center-of-image indictor. For example, the sensor 240 collects and generates annotation data for the graphics overlay text or symbology, which annotation data is passed to the CPU 70 via the header controller 210 (discussed below) and the bus interface 20. For images to be displayed, graphics overlay text or symbology is provided by the CPU 70 and written to video memory in the graphics controller 180 of the display image formation block 170 (discussed below).

The interface FIFOs 30 include, for example, one or more header FIFOs 90 communicating with the header controller 210, for example, via the header daughterboard connector 12 in the mezzanine interface 10, one or more image FIFOs 100 communicating with the image controller 200, for example, via the image daughterboard connector 14 in the mezzanine interface 10, and/or one or more graphics FIFOs 110 communicating with the graphics controller 180 in the display image formation block, for example, via the graphics daughterboard connector 16 in the mezzanine interface 10. The interface FIFOs 30 reside, for example, on the main board. The interface FIFOs 30, for example, provide an elastic memory buffer between the main board and the sensor interface and graphics mezzanine.

The image memory 60 includes volatile or non-volatile memory. For example, the image memory 60 includes volatile memory, such as random access memory, fast cycle random access memory, ferro-electric random access memory, fast page mode random access memory, extended data out random access memory, double data rate random access memory, dynamic random access memory, static random access memory, Rambus dynamic random access memory, synchronous dynamic random access memory ("SDRAM"), synchronous dynamic link random access memory, and/or equivalent memory structures. The image memory 60 includes, for example, one gigabyte of SDRAM organized as a 64-bit by 256 kilobit array. The image memory 60 is divided into a number of logical image blocks, each storing a captured sensor image. The image memory 60 is controlled by the image memory/FIFO controller 40 and is accessed directly by the first data router 50 under the control of the image memory/FIFO controller. The image memory/FIFO controller 40, the first data router 50, the image FIFO 100, and the header FIFO 90 cooperate with the image memory 60 to facilitate the image memory 60 to serve as a rolling buffer, as discussed below.

The image memory/FIFO controller 40 provides low-level control of the image memory 60 and arbitration of requests for image memory 60 accesses from multiple sources. The image memory/FIFO controller 40, for example, allows simultaneous access into the image memory 60 from a sensor, out of the image memory 60 for video display, out of the image memory 60 for transmission to the compression board 120 (discussed below), and/or into or out of the image memory 60 via the bus interface 20. The image and header FIFOs 100, 90 allow the image memory/FIFO controller 40 to burst data into and out of the image memory 60 at a rate independent of the sensor rate. The image memory/FIFO controller 40 uses a burst scheme to achieve high memory throughput. By way of example, some types of memory devices used to implement the image memory 60 require several command cycles to access their contents. For example, if the image memory 60 includes SDRAM devices, the SDRAM devices require twelve command cycles. For example, the number of elements to read or write is one of the parameters included in the setup of an access. When performing a small length access, these cycles represent a large percentage of the total number of cycles for the access. To minimize performance degradation due to these wasted cycles, large bursts are employed, for example, to reduce the percentage of command cycles to data cycles. When displaying an area of interest, for example, it is cheaper from a performance standpoint, for example, to burst all of the image data of a given frame out of the image memory 60 and ignore any unneeded pixels. It is cheaper because the image data to be displayed need not be contiguous in the image memory 60, and thus the address may be changed numerous times. Each time the address must be updated, the setup cycles must be executed, significantly reducing the memory throughput. The described bursting scheme provides a high memory bandwidth, such as a memory bandwidth over 500 Mbytes/Sec. The image memory/FIFO controller 40 is optionally FPGA-implemented on the main board. Alternatively, the image memory/FIFO controller 40 is implemented, for example, in an application specific integrated circuit, a complex programmable logic device, a configurable logic device, or other equivalent circuit logic.

The first data router 50 determines the destination of data read out of the image memory 60 and the location to which data is written in the image memory 60. The first data router 50 is hosted, for example, within an FPGA on the main board. Alternatively, the first data router 50 is implemented, for example, in an application specific integrated circuit, a complex programmable logic device, a configurable logic device, or other equivalent circuit logic.

The compression board 120 includes, for example, Space Dynamics Laboratory's Advanced Reconnaissance Compression Hardware ("ARCH") system, or a compression board using, for example, two-to-one lossless compression using JPEG 2000 compression, eight-to-one lossy JPEG 2000 compression, or equivalent, standard compression algorithms. The compression board 120 communicates with a second data router 130, which communicates with a data recorder 140 and/or a data link 150. The data recorder 140 includes, for example, a data storage device, such as a hard disk, a redundant array of independent disks, a magnetic tape storage system, and/or a micro-electro-mechanical systems-based storage device. The data link 150 includes, for instance, a continuous, intermittent, user-initiated, or target-identification-initiated transmitter to transmit image frames to a receiver (not shown) over a communications channel or medium. The receiver is, for example, land-based, air-based, or sea-based. An example of a sea-based receiver is a receiver on an aircraft carrier. An embodiment of the data link 150 in an unmanned aerial vehicle or a land-based image capture station includes, for example, a transmitter activated by positive target identification to limit communications channel usage to high value or time-sensitive image transmissions, thereby reducing the likelihood of detection. Optionally, the compression board 120 matches the sensor 240's data acquisition rate to the data transfer rate of the data recorder 140 and/or the data link 150.

The command/control input device 160 communicates with the CPU 70. The CPU 70 communicates with a bus connector 80, which in turn communicates with the image memory/FIFO controller 40 through the bus interface 20. The command/control input device 160 includes, for example, a mouse 300; a touch pad 310; a pointer controller 320; a scroll wheel 330; a key pad 340; rotary, push-button, joystick toggle switches, for example, to zoom in or out; a "Pre-Trigger" selector 350; a "Post-Trigger" selector 360; and/or an "Edit Mode/Live Mode" push button selector 370. For example, a user uses the command/control input device 160 to exploit an image for display, for instance, by panning, zooming, and/or selecting. The command/control input device 160, for example, enables the user to annotate or mark targets on a displayed image or program a sensor in spot mode to identify and capture an image of a target. Target marking is the process of placing an indexing tag on the recording device when an image is selected. This makes it easier to find the image on a tape, for example. For example, a user presses an input button on the command/control input device 160, and a "mark" corresponding to the type of user-input is written to the image memory 60 and/or the data recorder 140, for example, as embodied in a digital tape.

Optionally, the command/control input device 160 includes input controls for standard reconnaissance functionalities, such as pre-trigger and post-trigger, using, for example, a "Pre-Trigger" selector 350 and a "Post-Trigger" selector 360, respectively. Pre-trigger causes the image memory/FIFO controller 40 to treat the image memory 60 as a rolling buffer up to a user-initiated trigger. Pre-trigger facilitates review of images prior to an event of interest. In an embodiment of the invention, pre-trigger mode is explained as follows. Images are continuously written to the image memory 60 in a first-in-first-out mode. When a pre-trigger input is generated at the command/control input device 160, the last N images are stored for review, where N is predetermined by the user or the ARIES manufacturer, for example, and dependent on the size of the image memory 60.

In post-trigger mode, for example, no images are stored in the image memory 60 until a post-trigger input is generated at the command/control input device 160. After the post-trigger input, the next N images are stored in the image memory 60, where N is predetermined by the user or the ARIES manufacturer, for example, and dependent on the size of the image memory 60. That is, post-trigger causes the image memory/FIFO controller 40 to treat the image memory 60 as a rolling buffer only after a user-initiated trigger. Post-trigger facilitates study of images of events evolving after an initial event of interest.

Alternately, the command/control input device 160 operates in an autonomous mode, or the CPU 70 is selectively programmed for the autonomous mode. In such an autonomous mode, one or more triggers are pre-defined by the user or the ARIES manufacturer with respect to, for example, event, target, and/or geolocation. For example, in a geolocation-defined trigger mode, image data flows into the image memory 60. As each image is received, the latitude and longitude of the four corners of the image are checked by the CPU 70 to determine whether the image covers a user-determined latitude and longitude. If so, the image is saved in the image memory 60. This process repeats until the image memory 60 is full and/or all of the geolocation-defined targets have been acquired.

FIG. 2 shows the sensor interface and graphics mezzanine. Optionally, the components of the mezzanine communicate with the components of the main board via the mezzanine interface 10. The sensor interface and graphics mezzanine includes the mezzanine interface 10, a display image formation block 170 including a graphics controller 180 and a video generator 190, the image controller 200, the header controller 210 and one or more sensor interfaces 220.

The graphics controller 180 outputs, for example, pixel data and video control to the video generator 190. The video generator 190 converts the pixel data into a format appropriate for the display 230. The display 230 includes, for example, an analog display, a digital display, or a video monitor. For example, the video generator 190 outputs display data corresponding to the display type, such as analog RS-170/RGB-formatted video data to an analog display, digital RGB-formatted video data to a digital display, and/or National Television Systems Committee-formatted ("NTSC") video data to a color monitor. Alternate video generators 190 generate outputs conforming to other standard display formats. Thus, the display image formation block 170 permits ARIES to be agnostic relative to display types or display vendors. Using an analog display as an example of a suitable display, the graphics controller 180 receives image and overlay data from the main board, decimates the received image to display, for example, the desired 512 pixel×512 pixel block at a zoom level directed by, for example, the command/control input device, adds the required RS-170 format syncs, and writes the digital image to the video generator 190 where it is converted to a format adapted for the user's display 230. For example, the video generator 190 includes a digital-to-analog converter ("DAC"), which converts the digital image to an RS-170/analog RGB-compliant signal for an analog display. The graphics controller 180 outputs video control including digital-to-analog converter control to the video generator 190, which includes the video DAC and which outputs analog RGB video data to the analog display. Continuing with this example, if an 8-bit DAC is used to implement the video generator 190, 256 shades of gray can be shown on the analog display.

Depending on the desired zoom in or zoom out input to the command/control input device 160, the graphics controller 180 decimates the received image by reading every nth pixel, wherein the greater the n, the lower the resolution. Alternatively, depending on the desired zoom in or zoom out input to the command/control input device 160, the graphics controller 180 decimates the received image by averaging every n pixels, wherein the greater the n, the lower the resolution. U.S. patent application Ser. No. 09/514,176, filed 28 Feb. 2000 and entitled "METHOD AND SYSTEM FOR REAL-TIME IMAGE DISPLAY AND MANIPULATION," to Linne von Berg et al., incorporated herein by reference, discloses a method and system for image manipulation, such as zooming in and out of an image, suitable for use in accordance with an embodiment of the instant invention.

The sensor interface 220 includes one or more transmitters 250 and one or more receivers 260 communicating between a sensor 240 and with the image controller 200 and includes one or more transmitters 270 and one or more receivers 280 communicating between the sensor 240 and with the header controller 210. Such transmitters and receivers include, for example, low voltage differential signal ("LVDS"), fiber optic, current mode logic, emitter-coupled logic, and/or positive-referenced emitter-coupled logic transmitters and receivers.

Sensor interface transmitters 270 and receivers 280 communicating with the sensor 240 and with the header controller 210 transmit sensor command header data and receive sensor practice header data. Sensor command header data includes, for example, instructions to the sensor that are compliant with standard sensor image formats. The instructions are, for example, compliant with National Image Transmission Format ("NITF") and include, for example, inertial sensor data and programmed sensor pointer data. The inertial sensor data identifies a geolocation of the sensor 240. For example, the inertial sensor data includes GPS-aided Inertial Navigation System data. The programmed sensor pointer data identifies a desired orientation of the sensor 240. By way of example, the sensor 240's orientation is described by the sensor angles of one or more pixels of an image, such as a center pixel. Sensor practice header data includes sensor command header data updated to reflect actual sensor geolocations and orientations of the sensor upon capturing an image. The orientation of the sensor 240, for example, includes mounting information, that is, how the sensor 240 is mounted in or on its retainer in, for example, an aircraft pod, unmanned aerial vehicle, or land-based image capture station.

Alternatively, the sensor practice header data includes, for example, a decimated version of the captured image from the sensor 240. The decimated version is, for example, a fixed function of the sensor 240 and is in RS-170/analog RGB-compliant format. For example, the decimated image generated by the sensor 240 includes a 256 pixel×256 pixel thumbnail image. Although such decimated versions reduce time required to display an image, it is appreciated that not all sensors generate such decimated images.

The sensor interface transmitters 250 and receivers 260 communicating with the sensor 240 and with the image controller 200 transmit sensor operation status data and receive sensor image data. Sensor operation status data includes, for example, exposure control, temperature-dependent focus adjustments, sensor-mounting data, and/or image capture operation data. Sensor-mounting data reflects how the sensor 240 is situated. For example, if the sensor is in an aircraft pod or an unmanned aerial vehicle, the sensor-mounting data includes information concerning how the sensor 240 is mounted in the pod. The image capture operation data, for example, includes standard capture modes, such as a step-stare mode, a strip mode, and/or a target-spotting mode. The sensor image data includes image data captured by the sensor 240. For instance, each image includes a high resolution digital image.

The image resolution, at least in part, determines the number of images capable of being stored in the image memory 60 and in the data recorder 140. For example, such a high resolution image includes ten to fifty megabytes of data, and the image memory 60, for instance, includes one gigabyte of memory, wherein twenty to one hundred such high resolution images can be stored.

Although FIG. 2 shows the sensor operation data and the sensor command header data having respective channels to the sensor 240, alternatively, the sensor operation data and the sensor command header data, for example, are included in the same channel.

The image controller 200 latches and formats image data from the sensor 240 to be accepted by the main board. Optionally, it latches and formats image data from the main board to be transmitted to the compression board 120.

The header controller 210 latches and formats header data from the sensor 240 to be accepted by the main board. Optionally, it latches and formats header data from the main board to be transmitted to the compression board 120. Optionally, the header controller 210 transmits the header to the graphics controller 180 for display.

For simplicity, one sensor 240 is shown in FIG. 2. Alternatively, ARIES includes more than one sensor, wherein each sensor has a respective sensor interface. Sensor interface 250 and image and header controllers 200, 210 are specific to particular sensor types and/or sensor vendors, thus permitting main board components to be agnostic relative to sensor vendors and to sensor type. In this manner, various embodiments of ARIES can be adapted to accept data from different imaging sensors 240. Such sensors 240 include electronic intelligence sensors for identifying, for example, cell phones and RADAR; electro-optical sensors for identifying targets during daylight; infrared sensors for identifying targets during nighttime or identifying, for example, running engines, muzzle blasts, and flares; synthetic aperture radar sensors for identifying metal objects; hyper-spectral sensors for identifying camouflaged man-made objects; bio-sensors for identifying biological matter; and integrated sensors having two or more such functionalities. Examples of such sensors include Recon/Optical Inc.'s CA279, CA279H, CA279M, and CA61 sensors, Goodrich Corporation's DB110 sensor, and BAE Systems F-9120 sensor.

ARIES is operated in LIVE mode and/or EDIT mode, selected by command/control input device 160 via the bus interface 20. The flow of data in each mode is described below.

LIVE mode is described as follows, by way of example. Referring to FIG. 2, in an embodiment of the invention, data flows from a sensor to the receivers specified in the sensor interface. Image data is received on the image channel and header data is received on the header channel. The image data is latched and/or formatted for transmission to the main board in the image controller 200. The header data is latched and/or formatted for transmission to the main board and for transmission to the graphics controller 180 in the header controller 210. Data is presented to the main board via the image and header daughterboard connectors 14, 12 in the mezzanine interface 10, for example. Referring to FIG. 1, the image and header data is written to the interface FIFOs 30. Based on commands received via the bus interface 20, the image memory/FIFO controller 40 enables the first data router 50 to transfer data to one of a number of logical image blocks in the image memory 60. For example, there are forty logical image blocks in the image memory 60. The image blocks are filled sequentially until all are filled, and then the image blocks are over-ridden in a ring fashion. Optionally, any image block can be protected, effectively taking it out of the pool of available blocks. This image block protecting mechanism allows the user to store and review up to forty images in this example, wherein the image memory 60 includes forty image blocks.

Substantially concurrent with the process described above, the image memory/FIFO controller 40 enables the first data router 50 to transfer data from the image memory 60 to the interface FIFOs 30. The data transferred from the image memory 60 is the last image captured. Thus, the image being transmitted is delayed one frame time from when it was captured. The data is then driven from the image memory 60 for subsequent transmission to the compression board 120.

As described earlier, the image captured by the header controller 210 is also transferred to the graphics controller 180. In 'Live Mode', the graphics controller 180 decimates the incoming data by a factor in the horizontal and vertical dimensions and concatenates it with previously captured imagery to create a waterfall bitmap. For example, the graphics controller 180 decimates the incoming data by three in the horizontal and vertical dimensions. The resulting waterfall bitmap is then combined with overlay data from the CPU 70 via the bus interface 20, formatted, for instance, as a standard RS-170 video stream, and written to the video generator 190. In this example, the output of the video generator 190 is an analog video signal suitable for driving the display 230.

EDIT mode is described as follows, by way of example. Referring to FIG. 2, image and header data flows from the sensor 240 to the receivers 250, 270 specified in the sensor interface. Image data is received on the image channel by receiver 250, and header data is received on the header channel by receiver 270. The image data is latched and/or formatted for transmission to the main board in the image controller 200. The header data is latched and/or formatted for transmission to the main board in the header controller 210. Data is presented to the main board via the image and header daughterboard connectors 14, 12 in the mezzanine interface 10. Referring to FIG. 1, the image and header data is written to the interface FIFOs 30. Based on commands received from the CPU 70 via the bus interface 20, the image memory/FIFO controller 40 enables the first data router 50 to transfer data to the image memory 60. Commands are written to ARIES via register writes over the bus interface 20. The registers are sampled by ARIES to initiate, modify, or stop a given function. The status of ARIES is likewise read from the registers. For example, a data flow for ARIES commands is as follows. The CPU 70 initiates a memory write to an appropriate ARIES register. ARIES detects that a register has changed and takes the action denoted by the register write. For example, to initiate an image capture, the desired block number is written by the CPU 70 to the block register, and then the image start bit is set. To detect that the capture is occurring, the busy bit is read. When the capture complete bit is set, the entire image resides in the image memory 60.

The data is stored in the image memory 60 in one of two logical 'Live' buffers. The 'Live' buffer, to which is being written, is designated as 'in use.' In 'Edit Mode,' a waterfall of "stitched" images is optionally generated from the decimated or thumbnail images. Each such decimated image in the waterfall is assigned a number. After the user switches ARIES at the command/control input device 160 from 'Live Mode' to 'Edit Mode,' the user then selects the number of the image. A portion of the full high resolution image is displayed on the display. Then, while still in 'Edit Mode,' the user optionally steps through the series of images.

Substantially concurrent with the process described above, the image memory/FIFO controller 40 enables the first data router 50 to transfer data from the image memory 60 to the interface FIFOs 30. The data transferred from the image memory 60 is taken from the 'Live' buffer, which is designated as not 'in use.' Thus, the two 'Live' buffers are alternately written to and read from. The data is then driven from the image memory 60 for subsequent transmission to the compression board 120. In addition to sending the last captured image to the compression board 120, ARIES transfers the logical image block selected via the bus interface 20 to the sensor interface and graphics mezzanine. For example, a 512 pixel×512 pixel portion of the image specified by the command/control input device 160 via the bus interface 20 is then combined with overlay data and formatted into an RS-170 bitmap.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. An apparatus comprising:
   an image buffer;
   a graphics buffer;
   a memory;
   a router;
   a sensor interface;
   a memory controller for controlling transfer of image data from said image buffer to said memory via said router and for controlling transfer of graphics data from said memory to said graphics buffer via said router;
   an image controller simultaneously operable with said memory controller or controlling transfer of the image data from said sensor interface to said image buffer;
   a video generator; and
   a graphics controller for receiving graphical data from said graphics buffer and for transferring at least a portion of the graphical data to said video generator, said video generator generating, based in part on the at least a portion of the graphical data, output conforming to a display type, wherein said graphics controller comprises a live mode and an edit mode.

2. The apparatus according to claim 1, wherein said sensor interface comprises a receiver and a transmitter.

3. The apparatus according to claim 1, further comprising:
   a header buffer; and
   a header controller simultaneously operable with said memory controller for controlling transfer of header data from said sensor interface to said header buffer.

4. The apparatus according to claim 3, further comprising a sensor for communicating with said header controller via said sensor interface.

5. The apparatus according to claim 4, wherein said sensor includes at least one of an infrared sensor, a multi-spectral sensor, an electro-optical sensor, a synthetic aperture radar sensor, an electronic intelligence sensor, a hyper-spectral sensor, a microwave sensor, and a biological agent sensor.

6. The apparatus according to claim 4, wherein said header controller transmits a sensor header command to said sensor via said sensor interface.

7. The apparatus according to claim 6, wherein said sensor header command comprises an orientation instruction for said sensor.

8. The apparatus according to claim 1, further comprising a sensor for communicating with said image controller via said sensor interface.

9. The apparatus according to claim 8, wherein said sensor includes at least one of an infrared sensor, a multi-spectral sensor, an electro-optical sensor, a synthetic aperture radar sensor, an electronic intelligence sensor, a hyper-spectral sensor, a microwave sensor, and a biological agent sensor.

10. The apparatus according to claim 8, wherein said image controller receives a sensor operation status to said sensor via said sensor interface.

11. The apparatus according to claim 10, wherein said sensor operation status comprises an image capture parameter for said sensor.

12. The apparatus according to claim 1, wherein said memory comprises a plurality of images, said apparatus further comprising:
   a control panel for communicating with said memory controller to at least one of select an image of the plurality of images, select a portion of the image for transfer to said graphics buffer, select an image resolution of the portion, and designate a point of interest in the portion, wherein said control panel comprises at least one of a selector for at least one of said live mode and said edit mode, a pre-trigger selector, and a post-trigger selector.

13. An apparatus comprising:
   a header buffer;
   a graphics buffer;
   a memory;
   a router;
   a sensor interface;
   a header controller for controlling transfer of header data from said sensor interface to said header buffer;
   a memory controller simultaneously operable with said header controller for controlling transfer of the header data from said header buffer to said memory via said router and for controlling transfer of graphics data from said memory to said graphics buffer via said router;
   a video generator; and
   a graphics controller for receiving graphics data from said graphics buffer and for transferring pixel data to said video generator, said video generator converting said pixel data into display format data, wherein said graphics controller comprises a live mode and an edit mode.

14. The apparatus according to claim 13, wherein said header controller transmits a pointer command to said sensor interface.

15. The apparatus according to claim 14, wherein said pointer command compensates for a difference between a programmed sensor position and an actual sensor position.

16. The apparatus according to claim 13, further comprising:
 a compressor for communicating with said header buffer;
 at least one of a data recorder and a data link; and
 a router interfacing between said compressor and said at least one of said data recorder and said data link.

17. The apparatus according to claim 13, further comprising:
 an image buffer; and
 an image controller simultaneously operable with said memory controller for controlling transfer of image data from said sensor interface to said image buffer.

18. The apparatus according to claim 17, wherein said image controller receives an image capture status from said sensor interface.

19. The apparatus according to claim 18, wherein said image capture status comprises at least one of exposure control data, temperature data, pod-mounting data, a step-stare instruction, a strip-mode instruction, and a spot-mode instruction.

20. The apparatus according to claim 17, further comprising:
 a compressor for communicating with said image buffer;
 at least one of a data recorder and a data link; and
 a router interfacing between said compressor and said at least one of said data recorder and said data link.

21. The apparatus according to claim 17, further comprising a sensor for communicating with said image controller via said sensor interface.

22. The apparatus according to claim 21, wherein said sensor includes at least one of an infrared sensor, a multi-spectral sensor, an electro-optical sensor, a synthetic aperture radar sensor, an electronic intelligence sensor, a hyper-spectral sensor, a microwave sensor, and a biological agent sensor.

23. The apparatus according to claim 13, wherein said memory comprises plurality of images, said apparatus further comprising:
 a control panel for communicating with said memory controller to at least one of select an image of the plurality of images, select a portion of the image for transfer to said graphics buffer, select an image resolution of the portion, and designate a point of interest in the portion, wherein said control panel comprises at least one of a selector for at least one of said live mode and said edit mode, a pre-trigger selector, and a post-trigger selector.

* * * * *

UNITED STATES PATENT AND TRADEMARK OFFICE
CERTIFICATE OF CORRECTION

PATENT NO.       : 7,659,906 B2                                          Page 1 of 1
APPLICATION NO. : 10/911754
DATED            : February 9, 2010
INVENTOR(S)      : LinneVonBerg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1578 days.

Signed and Sealed this

Thirtieth Day of November, 2010

David J. Kappos
*Director of the United States Patent and Trademark Office*